(12) United States Patent
Smith

(10) Patent No.: US 6,533,466 B1
(45) Date of Patent: Mar. 18, 2003

(54) HYBRID CONNECTOR ASSEMBLY FOR ELECTRICAL CONDUCTORS AND FIBER OPTIC DATA CONDUCTORS

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 09/656,918

(22) Filed: Sep. 7, 2000

(51) Int. Cl.[7] .................................................. G03B 6/38
(52) U.S. Cl. ........................ 385/75; 385/78; 385/60; 439/106; 439/577; 439/651
(58) Field of Search .......................... 385/75–77, 78, 385/64; 439/106, 107, 577, 651

(56) References Cited

U.S. PATENT DOCUMENTS

| | | | | |
|---|---|---|---|---|
| 4,486,072 A | * | 12/1984 | Roberts | 385/64 |
| 4,767,181 A | * | 8/1988 | McEowen | 385/78 |
| 5,696,861 A | * | 12/1997 | Schimmeyer et al. | 385/75 |
| 5,967,840 A | * | 10/1999 | Rose et al. | 439/577 |
| 6,206,729 B1 | * | 3/2001 | Bradley et al. | 439/608 |

* cited by examiner

Primary Examiner—Hemang Sanghavi
Assistant Examiner—Scott Knauss
(74) Attorney, Agent, or Firm—Laurence R. Letson

(57) ABSTRACT

A combination or hybrid connector, for connecting both an electrical connection and an optical signal connection simultaneously, incorporates a fiber optic conductor aligned with and contained within the ground pin of an electrical power plug. A fiber optic conductor is contained within a mating receptacle unit to which the electrical power is plug connected. The fiber optic conductor of the plug extends beyond the ground pin to enter, be aligned and interface with a fiber optic conductor within the receptacle unit. The end of the fiber optic conductor in the plug is shielded and the shield is retractable upon engagement with the alignment device. The alignment device is fabricated to have a converging interior space which receives the fiber optic conductor of the plug and gently bends the plug fiber optic conductor to an aligned position to place the end thereof closely juxtaposed with the end of the fiber optic conductor of the receptacle. The shield is self-restoring so that upon disengagement of the plug from the receptacle the shield extends or restores to its original form again to shield the fiber optic conductor extending from the ground pin.

19 Claims, 4 Drawing Sheets

HYBRID CONNECTOR ASSEMBLY FOR ELECTRICAL CONDUCTORS AND FIBER OPTIC DATA CONDUCTORS

FIELD OF THE INVENTION

This invention relates to connecting both electrical power and optical data signals to a device for receiving and sending such signals over a fiber optic conductor in a optical data signal network or portion thereof; more specifically the invention relates to a plug and receptacle for simultaneously connecting the electrical conductors for supplying electrical power to a using device and aligning and connecting fiber optic conductors to juxtapose the ends of the fiber optic conductors in close proximity, thereby facilitating transmission of optical data signals from one of the fiber optic conductors to another.

BACKGROUND OF THE INVENTION

Many data processing and transmission devices, especially personal computers, are electrically powered by connections to standard household receptacles and also are networked or interconnected by wide area and local area networks with other computers, servers and related data processing and transmission devices. This permits the rapid and accurate interchange of data between interconnected computers.

Typically, the higher capability computers are networked or interconnected over a network at least some of which is comprised of fiber optic transmission lines; the lower capability computers are interconnected to networks through an electrical data connection, and the electrical signal may be further converted to an optical signal by converters or transceivers within the network.

Optical signals have vast advantages over digital or analog electrical signals because optical signals are not affected by electrical interference from other electrical or electronic devices positioned close to the optical fiber data transmission lines and the data bandwidth of optical conductors is much greater than corresponding electrical conductors, thereby permitting the rapid transmission of much larger amounts of data.

As the cost of electronic to optical and optical to electronic conversion devices or transceivers are reduced with wider spread usage and the speeds of data transmission are increased, it is highly desirable to carry the optical signal as close to the using device as possible. This necessitates the optical signal transmitting fiber optic conductors must be easily and reliably connected to the fiber optic conductor network; typically, this is accomplished with a specialized connector on the ends of two fiber optic cables. The electrical power connections for the devices have remained relatively standard.

In the future, it is anticipated that computers and servers and related data using or transmitting devices will be designed with optical signal capability. Moreover, "dumb" devices (those which do not use external data), such as home heating and air conditioning units, toasters, coffee makers, and other household appliances that presently do not use optical signals for their external control data input such as televisions will either incorporate optical signal capability in their functions or be controllable by programable controllers or computers communicating with the devices over fiber optic cable.

When such interconnection and networking of devices such as these is accomplished, a need will exist for a single connector and receptacle to connect both the electrical power and the optical signal conductors, while eliminating the need for two separate connectors, two separate connection sites and two separate cables to the device or appliance. In order to provide the most efficient wiring of structures, a receptacle must be not only a hybrid but also a receptacle capable of accepting the standard 120 volt alternating current plug for other uses.

Additionally, due to the fragile and delicate nature of the glass strands that make up the fiber optic transmission network, external and unprotected optic fibers must be prevented from being bent too sharply in order to prevent optical fiber breakage and/or interruption of the optical signal data flow.

The incorporation of the optical fiber within the structure of a conventional electrical power cord will reduce the bend radius which may be imposed on the optical fiber due to the stiffness of the power cord in relation to the stiffness of the fiber optic conductor. This combination of electrical conductors and fiber optic conductors further accentuates the need for a single connection device to connect the electrical/optical cable conductors of a hybrid cable to a mating receptacle terminating an electrical cable and a optical fiber cable.

OBJECTS OF THE INVENTION

It is an object of the invention to connect both electrical power and optical transmission conductors with a single connector to an electrical power source and an optical signal network.

It is another object of the invention to reliably connect both electrical power and optical signal conductors by means of a single connection device.

It is a further object of the invention to align optical signal conductors leading to a device utilizing optical signals and connected to a transmission optical fiber during the connection of electrical power.

It is an additional object of the invention to progressively deflect one optical signal conductor to align the end of the conductor with the end of a second optical signal conductor during the mating of combination connectors for the optical conductor and electrical power conductors.

It is a still further objection of the invention to maintain the ends of the electrical cable and the end of the optical fiber in close proximity.

Other objects of the invention will become apparent to one of skill in the art of fiber optic communications and connections. The foregoing objects of the invention are not intended to limit the invention in any manner.

SUMMARY OF THE INVENTION

The lack of a single easily used, standard hybrid connector for connecting both electrical power and optical signals to an using device is overcome, and the objects of the invention are accomplished by this invention.

A combination hybrid plug and receptacle providing both electrical power and optical signal connection incorporates a plurality of blades with a ground pin projecting from a plug structure as well as a plurality of internally contained frictional electrical contacts to accommodate the shape and orientation of the blades and a separate contained ground contact to engage the ground pin within a receptacle assembly. The blades and the power contacts are individually connected to the electrical power conductors of the power cable of the using device, such as a computer, server, controller, appliance, or other device utilizing optical signals and the electrical wiring of the house or office or other similar structure.

The ground pin of the plug and the ground contact of the receptacle assembly are similarly attached to the ends of the respective ground wires of the electrical wiring and the power cable and further will provide the connecting contact to interconnect the power cable ground wire to the ground wire of the electrical wiring.

The ground pin of the plug is a tubular structure of copper or other metal. The hollow space within the ground pin is occupied, at least partially, by a optical fiber extending therethrough and projecting by a predetermined distance from the end of the ground pin. The optical fiber or conductor may be encased within a protective coating or sheath and is fixed in or potted within the hollow ground pin so as to be carried and supported by and to be immovable with respect to the ground pin. The exposed end surface of optical fiber is polished and finished to provide an entrance/exit face for the optical signal to pass through and into the entrance/exit face of the juxtaposed network optical fiber.

The receptacle assembly provides a structure to support a fiber optic conductor. This structure aligns and supports a fiber optic conductor with the center axis of insertion of the ground pin of the plug. The end of the fiber optic conductor extends from the ground pin to be inserted into the ground contact of the hybrid receptacle and end face of the fiber optic conductor is disposed to be very close to the plane of the end surface of the network fiber optic conductor incorporated within the ground pin of the plug.

The fiber optic conductor in the receptacle is held in a fixed position, and the end of the fiber optic conductor is encircled by an alignment device. This alignment device engages the periphery of the tip of the fiber optic conductor of the plug by a hollow frustro-conical surface or other structure which has a progressively smaller interior cross-section until the cross-section is substantially the same diameter as that of the fiber optic conductor of the plug at approximately the plane of the end surface of the fiber optic conductor of the receptacle.

The guiding function of the alignment device progressively deflects and guides the fiber optic conductor of the plug to dispose the end surface of the fiber optic conductor to a position in alignment with the end surface of the fiber optic conductor disposed within the receptacle so that these two end surfaces both are aligned and juxtaposed upon full insertion of the plug into the receptacle and, at the same time, are adjacent but not touching. The insertion and connection of the plug into the receptacle engages the electrical contact blades of the plug and the ground pin with their respective electrical contacts completing the connection of the electrical power path and ground path between the electrical wiring and the using device.

The tip of the fiber optic conductor of the plug is protected by a deformable or a displaceable shielding device, whenever either displaced or collapsed, exposes the tip of the plug fiber optic conductor. Such a shielding device may be either a retractable rigid solid sleeve or a deformable rubber-like elastomeric material enclosing dome with a cut in the end of the dome aligned with the fiber optic conductor therein. The dome or the solid sleeve is disposed both to engage the alignment device and to be deformed and/or displaced. This inserting motion and engagement causes the elastomeric dome or sleeve to be retracted from the tip of the fiber optic conductor in the plug. The retraction motion exposes the tip and end surface of the fiber optic conductors so that the end surface may be positioned juxtaposed with the end surface of the fiber optic conductor mounted in the receptacle assembly.

As the electrical plug and the fiber optic conductor connections are incorporated into a single plug/receptacle combination, the fiber optic conductor may be incorporated into the power cable of the device being powered and supplied with optical data signals. The size and stiffness of the power cable may be adapted to provide protection against the fiber optic conductor being subject to potential bends so sharp or of so small a radius to cause damage to or breakage of the fiber optic conductor.

If desired, a small collimating lens may be incorporated in the receptacle positioned between the end surface planes of the filly inserted plug fiber optic conductor and the receptacle fiber optic conductor in order to precisely focus the light signals from the sending fiber optic conductor onto the end surface of the receiving fiber optic conductor.

A better and more complete understanding of the invention may be had from the attached drawings and the Detailed Description of the Invention that follows.

DETAILED DESCRIPTION OF THE PREFERRED EMBODIMENT OF THE BEST MODE FOR IMPLEMENTING

THE INVENTION AS CONTEMPLATED BY THE INVENTORS

Figure 1:
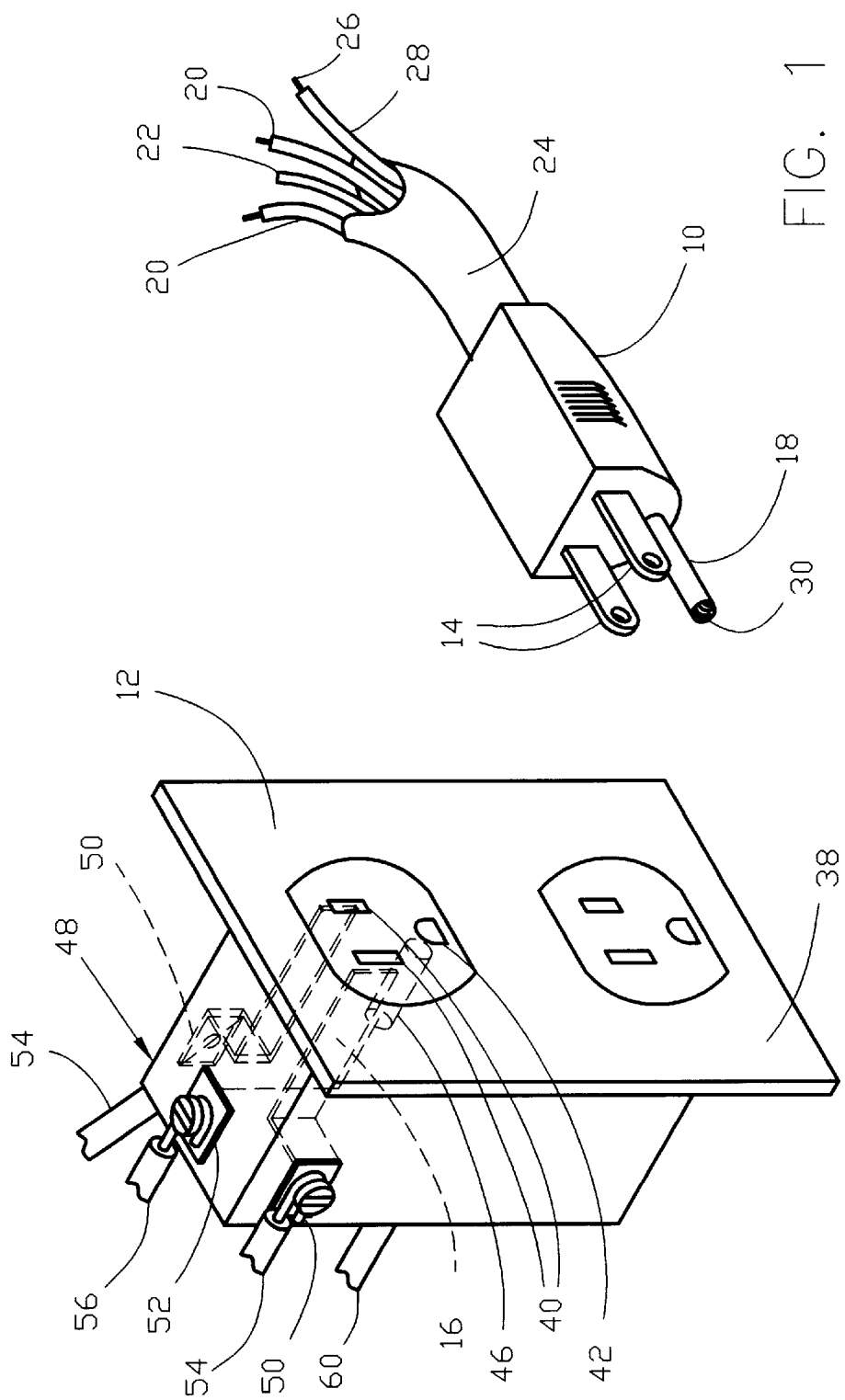
FIG. 1 is an illustration of a plug and receptacle incorporating the invention with the plug and receptacle separated for clarity.

Referring initially to FIG. 1, illustrated in a disconnected condition relative to each other are hybrid plug 10 and hybrid receptacle 12 of the invention for interconnecting both electrical conductors 20 as well as optical signal conductors 22.

The plug 10 is provided with a pair of conventionally shaped and sized blades 14, connected to a pair of electrical power conducting wires 20 or conductors 20 and, upon insertion into receptacle 12, disposed for engagement with contacts 16 within receptacle 12. Similarly, plug 10 is provided with a ground pin 18 formed of a hollow metal cylinder and having an open outer end, which is electrically connected to an electrical conductor 22, which, in turn, would be connected to electrical ground of the device (not shown) incorporating cable 24 and plug 10.

The ground pin 18 is provided with a conventional crimp-type electrical connection to engage and crimp onto the wire of ground conductor 22, leaving the tubular hollow interior of ground pin 18 unobstructed. A fiber optic conductor 26 along with its protective coating 28 are disposed within ground pin 18 and with at least the fiber optic conductor 26 extending beyond the end of the ground pin 18. The fiber optic conductor 26 is fixed into position within the ground pin 18 by filling the annular space between the protective coating 28 of the fiber optic conductor 26 and the ground pin 18 with a potting compound or other material, which sets up as a solid.

Figure 2:
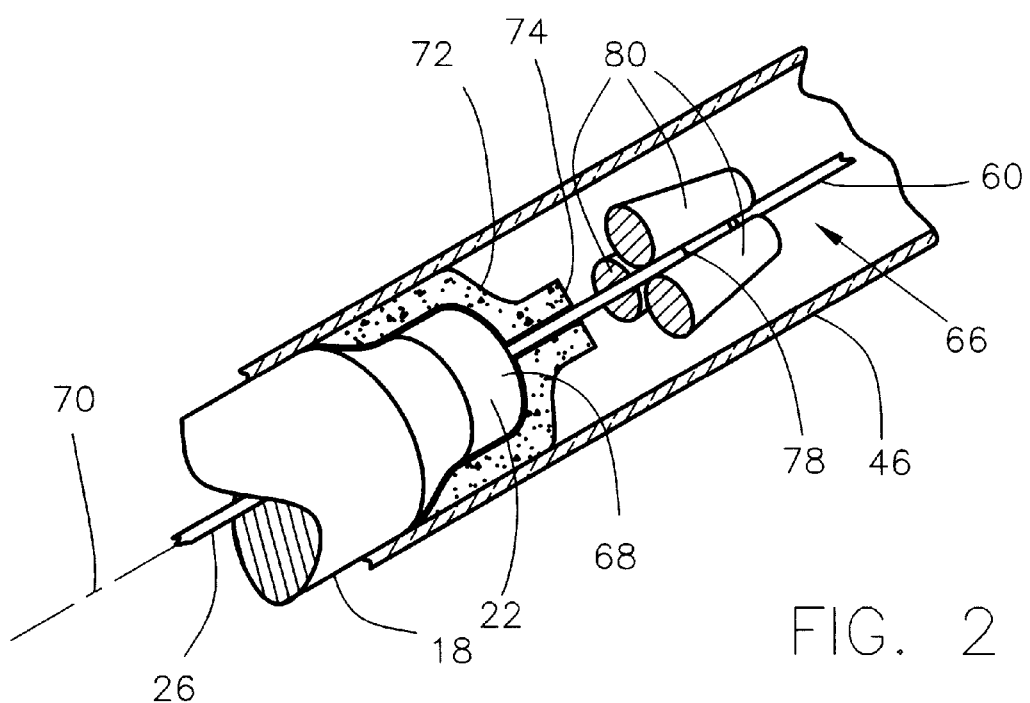
FIG. 2 is a diagrammatic depiction of the fiber optic connection of the optical fiber conductor in the plug and the optical fiber conductor in the receptacle.
Figure 4:
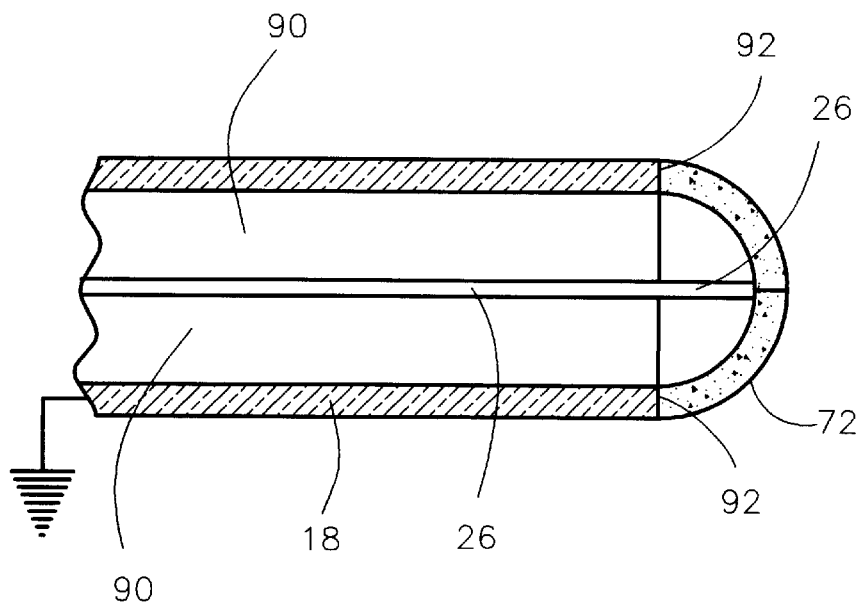
FIG. 4 is a section view of an end portion of the ground pin, elastomer tip cover and the fiber optic cable of the plug.
Figure 5:
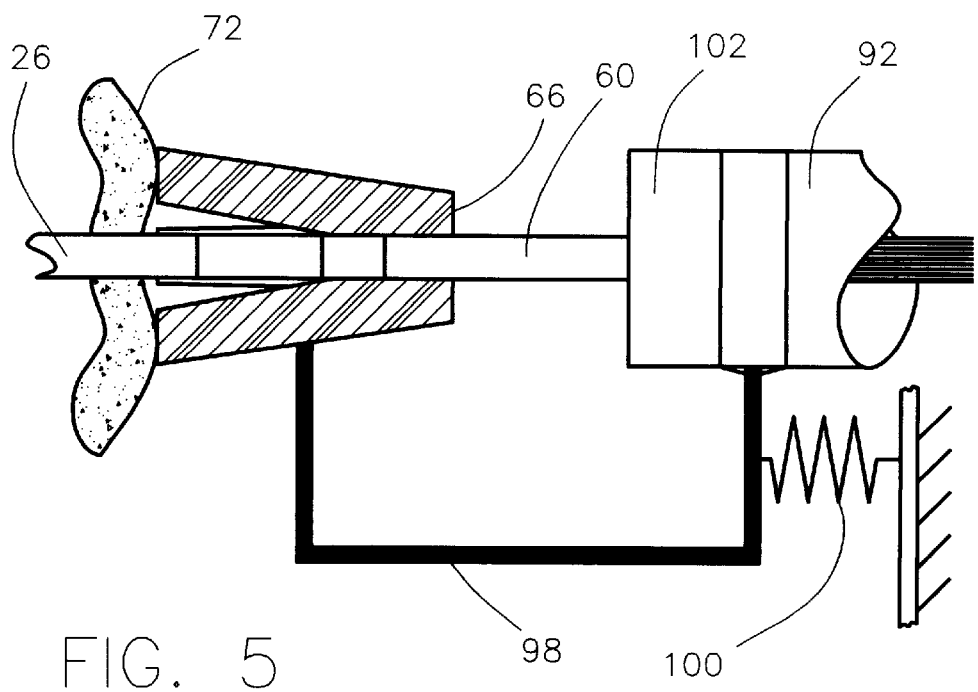
FIG. 5 is a section view of a spring-relieved alignment device wherein the fiber optic conductor may be accommodated and additionally the elastomer tip shield and ground pin will not cause a damaging interference with the alignment device as it is fully inserted into the receptacle.

In order to protect the fiber optic conductor 26, an elastomeric shield 30 is disposed on and attached to the end of ground pin 18 closing the end of the ground pin and enclosing the extended fiber optic conductor (not shown in FIG. 1 but observable in FIGS. 2, 4 and 5). The fiber optic conductor 26 is fixed in the ground pin 18 by adhesive, potting or other suitable material. The fixing of the fiber optic conductor 26 within the ground pin 18 stabilizes the length of the fiber optic conductor 26 which extends beyond the ground pin 18, which will be described in more detail below with reference to other figures of the drawings.

A hybrid electrical/optical receptacle 12 is further illustrated in FIG. 1. The electrical portions of the receptacle are conventional wherein the face surface 38 is formed with slots 40 formed therein to accept blades 14 and an opening 42 for admitting ground pin 18. Within receptacle 12 are electrical contacts 16, which are wipingly engageable with blades 14, and a split tubular electrical contact 46, which is wipingly engageable with the ground pin 18. The tubular contact 46 will engage the exterior surface of ground pin 18 and establish the electrical connection to ground for ground conductor 22 of cable 24.

Disposed either within tubular contact 46 or adjacent the inner end of the tubular contact 46 is an alignment device 66 not shown in FIG. 1, but described in detail below with reference to FIGS. 2, 3, 5 and 6 of the drawings.

The contacts 16, 46 are connected to terminals 50, 52 on the body 48 of receptacle 12; which in turn are connected, in a conventional manner, to these contacts 16, 46, electrical power supply conductors 54 and ground conductor 56.

Fiber optic conductor 60 is terminated at the alignment device 66 within receptacle assembly housing 48 and will be described in more detail below.

Referring now to FIG. 2. the connection of the fiber optic signal is illustrated. The tubular ground contact 46 is illustrated containing the alignment device 66, the ground pin 18, fiber optic conductor 26 and the receptacle fiber optic conductor 60.

Fiber optic conductor 26 is illustrated contained and fixed within ground pin 18 with the protected fiber optic conductor 26 extending from the interior end of ground pin 18 and either an unprotected or protected portion of the fiber optic conductor 26 projecting from the exterior end 68 of ground pin 18. The protective coating on a optical fiber 26 is thin and may be left in place as the exterior cylindrical surface of the optical fiber 26 need not and is preferably not exposed. The fiber optic conductor 26 may be retained within and aligned with the longitudinal axis 70 of the ground pin 18 by any of various methods. Acceptable retention methods need only be such that it is effective and not damage the continuity of the fiber optic conductor 26. The fiber optic conductor 26 must not be broken, cracked or crushed by excessive bending or abusive handing.

Examples of acceptable retention method include potting of the fiber optic conductor 26 in the ground pin 18; fitting the fiber optic conductor 26 within a compressible material and forcing the compressible material into ground pin 18, allowing the compressible material to expand; fitting the fiber optic conductor 26 within a compressible material and crimping the ground pin tube to trap the compressible material and fiber optic conductor 26 in the ground pin 18; or filling at least a part of an annular space between the ground pin and the fiber optic conductor 26 with an adhesive or bonding agent such as epoxy.

The ground pin may be swaged, necked or otherwise formed to form a neck of reduced diameter and an elastomeric shield 30 slipped over and attached to the exterior of the ground pin 18 near its tip. Alternatively, the elastomeric shield 30 may be attached with adhesive or by other conventional processes to the end of the tubular ground pin 18. Elastomeric shield 30 is pierced or cut to create an opening 74 therein, aligned with fiber optic conductor 26 so that the shield 30 may be retracted or deformed and forced back over the fiber optic conductor 26 1thereby exposing the fiber optic conductor 26 and its end face 78. The shield 30 may be retracted by engaging the region around the opening 74 with the alignment device 66 as the plug 10 and fiber optic conductor 26 are inserted into the receptacle 12. The alignment device 66 will push the shield 30 back from the end of the fiber optic conductor 26 and effectively collapse the elastomeric shield 30 under the compressing force exerted by the alignment device 66. Being elastic in nature and once relieved of the deforming and collapsing force exerted by the alignment device 66, elastomeric material will restore to its original extended shape and again contain and protect fiber optic conductor 26 and end face 78 thereof. The opening 74 in the elastomeric shield 30 may advantageously be cut in an "X" or cross-shape to ease the forces required to retract the shield 30 and reduce any friction between the shield 30 and the fiber optic conductor 26, insuring full restoration of the shield 30 upon release.

An alignment device 66 is desirably assembled from a plurality of rods 80, typically three, which are tapered. As the tapered rods 80 are assembled and formed into a bundle, the space within the bundle intermediate the rods 80 reduces in cross-section as the cross-section is taken progressively from the larger end to the smaller end of the alignment device 66. The space within the bundle intermediate rods 80 at the smaller end is partially occupied by the end of fiber optic conductor 60 and approximates the size necessary to admit and confine the exposed end of fiber optic conductor 26 whenever inserted. As fiber optic conductor 26 is inserted into the alignment device 66, any lack of concentricity of the fiber optic conductor 26 and the resulting misalignment of fiber optic conductor 26 with fiber optic conductor 60 is corrected as the narrowing of the space within the rod bundle of the alignment device 66 deflects and bends the end of fiber optic conductor 26 toward axis 70 and thus toward alignment with fiber optic conductor 60. Because optical fibers are flexible to a limited degree, the optical fiber in fiber optic conductor 26 may be slightly bent with no undesirable transmission affects.

Figure 3:
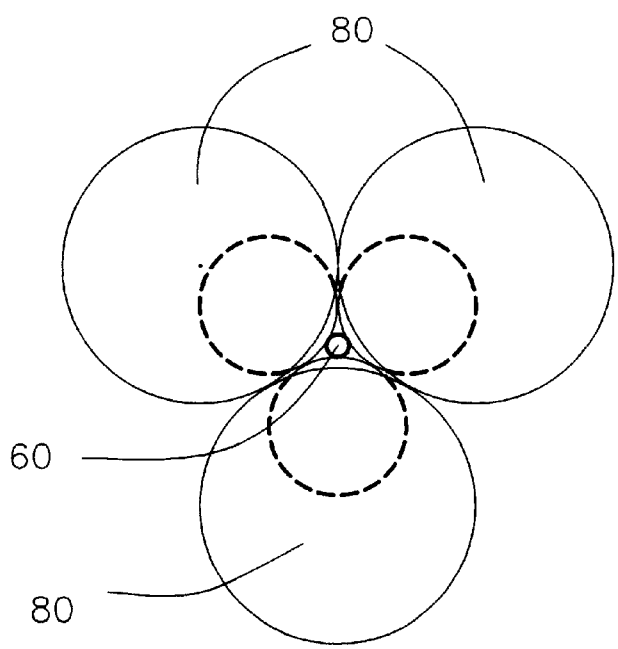
FIG. 3 is an illustration of an end view of one embodiment of the optical fiber conductor alignment device within the receptacle structure.

FIG. 3 more clearly shows the formation of the converging central space within the alignment device 66. The size of the tapered rods 80 are exaggerated to illustrate the concept of the alignment device 66 more clearly. The rods 80 may be assembled into the bundle in any desired manner and retained in the bundle by gluing banding or potting around them.

FIG. 4 illustrates the structure of the ground pin 18, fiber optic conductor 26 and elastomeric shield 30 in a section view, thereby providing more clarity. The ground pin 18 preferably is made of a copper alloy or a copper-plated steel sheet stock to provide not only high electrical conductivity but also the strength and rigidity necessary for repeated insertion against the wiping frictional engagement with ground contact 46 (shown in FIG. 1). The ground pin 18 is electrically connected to the machine ground of the powered device, (not shown).

The fiber optic conductor 26 extends beyond the end 92 of the ground pin 18 by a predetermined distance. This predetermined distance should be standardized. The end 92 will be closely juxtaposed with the end of fiber optic conductor 60 resident within the alignment device 66 described above with reference to FIGS. 2 and 3. The standardized extended length of the fiber optic conductor and the corresponding positioning of fiber optic conductor allows plugs 10 from various manufactures to be used with the fiber optic conductor end faces 38, 92 juxtaposed but not interfering with or damaging each other. The elastomeric shield 30 is shown in a second embodiment or version, attached or bonded to the end surface 92 of the ground pin 18. The annular space between the ground pin 18 and the fiber optic conductor 26 is filled with a material which is capable of immobilizing the fiber optic conductor 26 relative to ground pin 18, such as a potting material 90.

Referring now to FIG. 5, the fiber optic conductor 26 is shown entering the alignment device 66, in a sectioned illustration of the alignment device 66. The alignment device 66 is engaging the elastomeric shield 30, collapsing the shield 30 about the fiber optic conductor 26 to expose the fiber optic conductor 26 for engagement with and within the alignment device 66. As can be appreciated, as any misalignment of the fiber optic conductor 26 will be reduced to substantially none as fiber optic conductor 26 is inserted further into the converging interior of alignment device 66.

FIG. 4 also illustrates, in a diagrammatic manner, a stress relief arrangement which may be implemented within receptacle 12, if desired. The fiber optic conductor 60 may be mounted on a moveable bracket 98. Bracket 98 is spring-biased relative to any convenient rigid member of receptacle 12 and also supports alignment device 66. Movement of the alignment device 66 and bracket 98 against the bias of spring 100 is of no significant effect as the alignment device 66 will align the fiber optic conductor 26 without regard to small initial misalignments due to an off axis location of the alignment device 66. The fiber optic conductor 60 may be further encased within an outer protective layer 102 or heavy sheath 102 and the sheath 102 may be banded or clamped to the bracket 98. This feature may be of significant importance if the length of the ground pin 18 or the thickness of the elastomeric shield 30 is excessive to the extent that the fiber optic conductor 26 interferes with and potentially will be damaged by forcing fiber optic conductor 26 against the end surface of fiber optic conductor 60. The spring relief arrangement provides a small amount of movement for fiber optic conductor 60, bracket 98 and alignment device 66 necessary to accommodate any interference and prevent damage to fiber optic conductor 26. The spring relief arrangement described above also insures that the end face of fiber optic conductor 26 and the end face of fiber optic conductor 60 are pressed together to eliminate as much of an air gap as possible.

Figure 6:
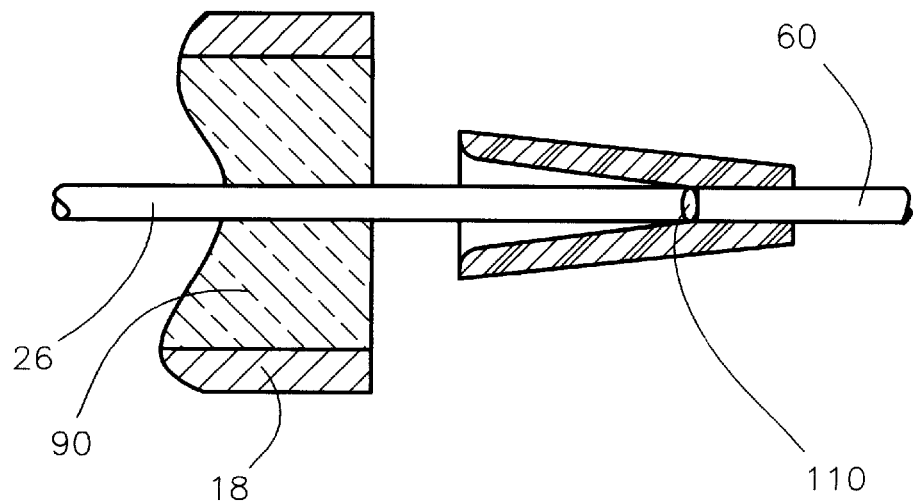
FIG. 6 is an illustration of a second embodiment of the alignment device incorporating a collimating lens.

FIG. 6 is an illustration of an alternative form of alignment device 66. As a substitute for the tapered rods 80 formed into a bundle creating a converging interior space between the rods 80, a solid member alignment device 110 with a hollow frustro-conical interior surface 112 may be substituted for the tapered rods 80. In all other respects, the positioning, function and operation of the alignment device 110 is fully analogous to the tapered rod 80 bundle of the alignment device illustrated in FIGS. 2, 3 and 5.

A further embodiment of the invention is shown in FIG. 6. FIG. 6 illustrates the same structure as FIG. 5 with the addition of a lens 110 mounted within the converging space within the alignment device 66. The lens is positioned such that the fiber optic focal length of the lens 110 collimates the light rays of the optical signal exiting fiber optic conductor 26 onto and into the adjoining fiber optic conductor 60 and conversely focuses any signal from fiber optic conductor 60 onto and into fiber optic conductor 26.

Figure 7:
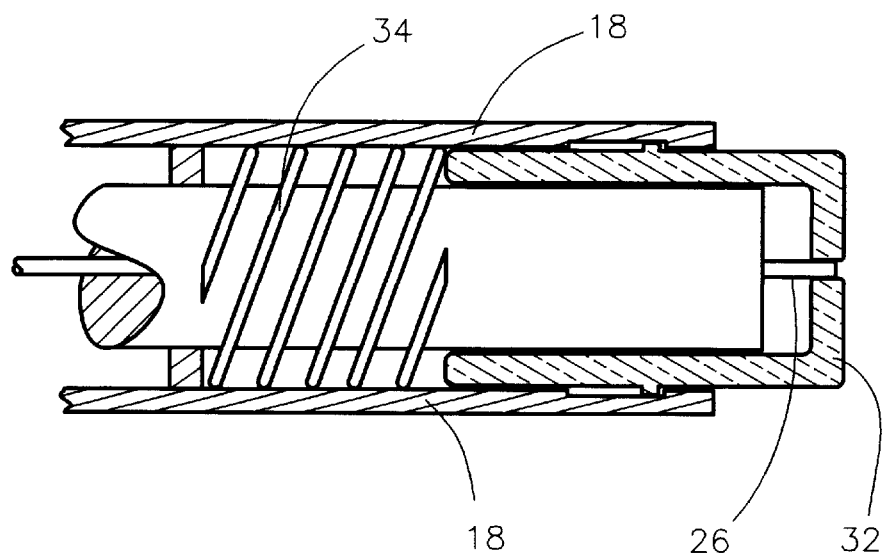
FIG. 7 shows a section view of a plug with a ground pin having a retractable sliding sheath or shield.

Referring now to FIG. 7, a shield 32 for the optical fiber 26 extending from ground pin 18 also may be fabricated to be rigid and to retract against a compression spring 34 within a hollow annular space 36 within the ground pin 18 and could be extended in a telescoping fashion by spring 34 upon being relieved and disconnected for the ground contact 46 of the receptacle 12 and the alignment device 66. The shield 32 then would be provided with a centering surface 44 interior to the shield 32 to guide the fiber optic conductor 26 as it exits the shield 32 upon shield retraction. Further guiding of the fiber optic conductor 26 for alignment with fiber optic conductor 60 is accomplished by alignment device 66 as described above.

Other embodiments of the invention will be recognized by and changes to and modifications of the structure of the invention may be envisioned by those of skill in the art upon a thorough understanding of the invention, It should be understood that the field of the invention, the background of the invention, objects of the invention and the detailed description of the invention are provide for a complete understanding of the invention and are not to be construed to limit the invention in any manner. Only the appended claims are intended to define the scope of the invention.

What is claimed is:

1. A combination fiber optic and electrical connector comprising:
    a plug further comprising:
        a pair of electrically conductive blades connected to a first pair of electrical conductors;
        a ground pin connected to a third electrical conductor;
        a fiber optic conductor housed within one of said conductive blades and said ground pin and extending therefrom;
        a plug housing enclosing ends of a second pair of electrical conductors, ends of said blades, a ground conductor and a fiber optic conductor, and supporting said ground pin, said blades, said electrical and fiber optic conductors,
        whereby electrical and ground connections and an optical connection are effected upon insertion of said plug into a compatible receptacle;
    said compatible receptacle comprising:
        a pair of engageable contacts for engaging said blades;
        a contact member for engaging said ground pin;
        a fiber optic member having an end; and
        an alignment member surrounding said end of said fiber optic member for aligning said fiber optic member with said fiber optic conductor upon insertion of said plug into said receptacle further comprising three frustro-conical members forming a convergent passage with one end of said passage reduced to a size to accept and confine said fiber optic member and said fiber optic conductor.

2. The combination fiber optic and electrical connector of claim 1 wherein said alignment member forms at least one surface engageable by said fiber optic conductor, progressively moving said fiber optic conductor toward an aligned position with progressive insertion of the fiber optic conductor therein.

3. The combination fiber optic and electrical connector of claim 2 wherein said alignment member is comprised of a plurality of frustro-conical surfaces.

4. The combination fiber optic and electrical connector of claim 3 wherein said frustro-conical interior surfaces converge to circumscribe a diameter substantially equal to a diameter of said fiber optic conductor.

5. The combination fiber optic and electrical connector of claim 1 wherein said ground pin further comprises a deformable protective member enclosing said fiber optic conductor and said alignment member projects beyond an end of said fiber optic member and engages and deforms fiber optic conductor.

6. The combination fiber optic and electrical connector of claim 2 wherein said frustro-conical members are in mutual contact along lengths of said frustro-conical members to form said converging surface.

7. A combination electrical and fiber optic outlet assembly comprising:

a pair of electrical contacts engageable with blades of an electrical plug;

a third electrical contact engageable with a ground pin of said electrical plug, and having an axis of connection along which said ground pin may be inserted:

a first fiber optic conductor end disposed proximate to said third electrical contact and aligned with said axis of connection;

an alignment member surrounding said first fiber optic conductor and engageable with a second fiber optic conductor insertable therein whereby upon insertion of a compatible plug into said outlet assembly, said electrical contacts and said first fiber optic conductor are aligned and connected respectively to said blades and said second fiber optic conductor carried by an electrical plug, said alignment member comprised of a plurality of at least three frustro-conical surfaces in mutual contact.

8. The combination electrical and fiber optic outlet assembly of claim 7 wherein said alignment member forms at least one surface engageable by said second fiber optic conductor for progressively moving said second fiber optic conductor toward an aligned position with progressive insertion of the second fiber optic conductor therein.

9. The combination electrical and fiber optic outlet assembly of claim 8 wherein said alignment member is comprised of a plurality of rod members arranged in a converging manner.

10. The combination electrical and fiber optic outlet assembly of claim 9 wherein said frustro-conical surfaces converge to a diameter substantially equal to a diameter of said fiber optic conductor.

11. A combination electrical and fiber optic outlet assembly of claim 8 wherein said alignment member projects beyond an end of said first fiber optic conductor and is engageable with a protective member on an exposed end of a ground pin, thereby to expose a portion of said second fiber optic conductor.

12. The combination electrical and fiber optic outlet assembly of claim 9 wherein said converging rod members are tapered over substantially their entire length to form said converging arrangement.

13. An electrical and optical connector assembly comprising:

a male electrical plug assembly;

a female electrical receptacle assembly;

a first fiber optic conductor projecting from said plug assembly;

a second fiber optic conductor recessed within said receptacle assembly;

a means for aligning said first fiber optic conductor with said second fiber optic conductor comprising a plurality of at least a portion of three frustro-conical surfaces in mutual contact defining a passage of progressively decreasing dimension, progressing into said receptacle assembly, said means for aligning said first fiber optic conductor with said second fiber optic conductor circumscribing a portion of said second fiber optic conductor, providing an increasingly confining passage for said first fiber optic conductor upon insertion thereinto;

a means for further aligning a light signal projecting from an end of one of said fiber optic conductors onto another of said fiber optic conductors, whereby a fiber optic conductor data signal connection and an electrical connection is made whenever said plug assembly is inserted and seated into said receptacle assembly.

14. The electrical and optical connector assembly of claim 13 wherein said means for aligning said light signal comprises a member having a hollow converging interior surface surrounding said second fiber optic conductor and encircling said end thereof and engageable with said first fiber optic conductor to align ends of both fiber optic conductors.

15. The electrical and optical connector assembly of claim 14 wherein said means for aligning said light signal further comprises a lens disposed intermediate said fiber optic conductors.

16. The electrical and optical connector assembly of claim 14 wherein said plug assembly comprises a ground pin and said first fiber optic conductor projects from a projecting end of said ground pin.

17. The electrical and optical connector assembly of claim 16 wherein said end of said first fiber optic conductor is shielded by a displaceable shield member supported by said ground pin.

18. The electrical and optical connector assembly of claim 13 wherein said end of said first fiber optic conductor is shielded by a displaceable shield member supported by said plug assembly.

19. The electrical and optical connector assembly of claim 18 wherein said shield member is engageable by said aligning means and deformed to expose said first fiber optic conductor end to said second fiber optic conductor.

* * * * *